Inventor.
WOLFGANG R. POTZSCH
By
Wilson, Settle, Batchelder
Att'ys. & Craig

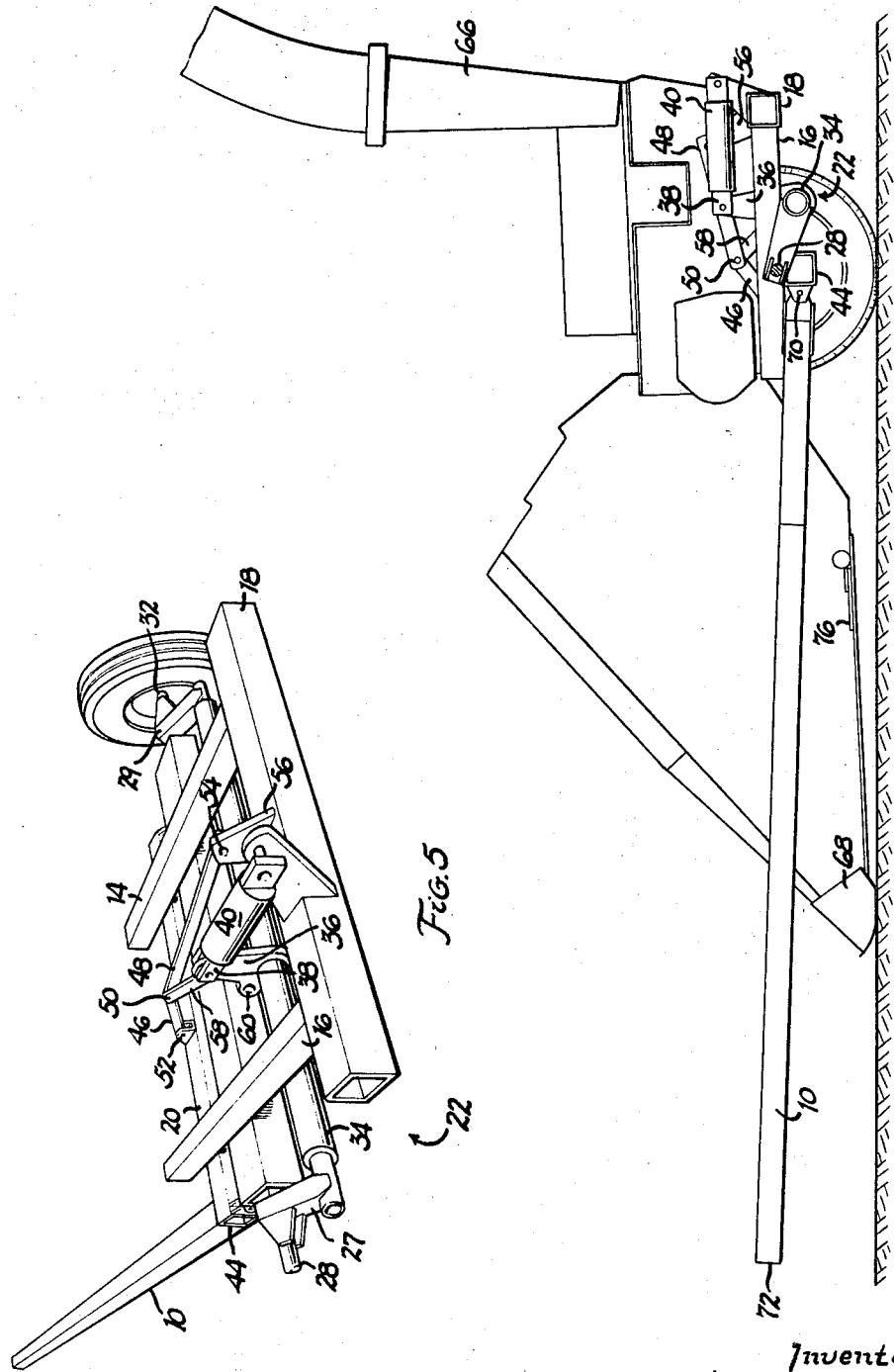

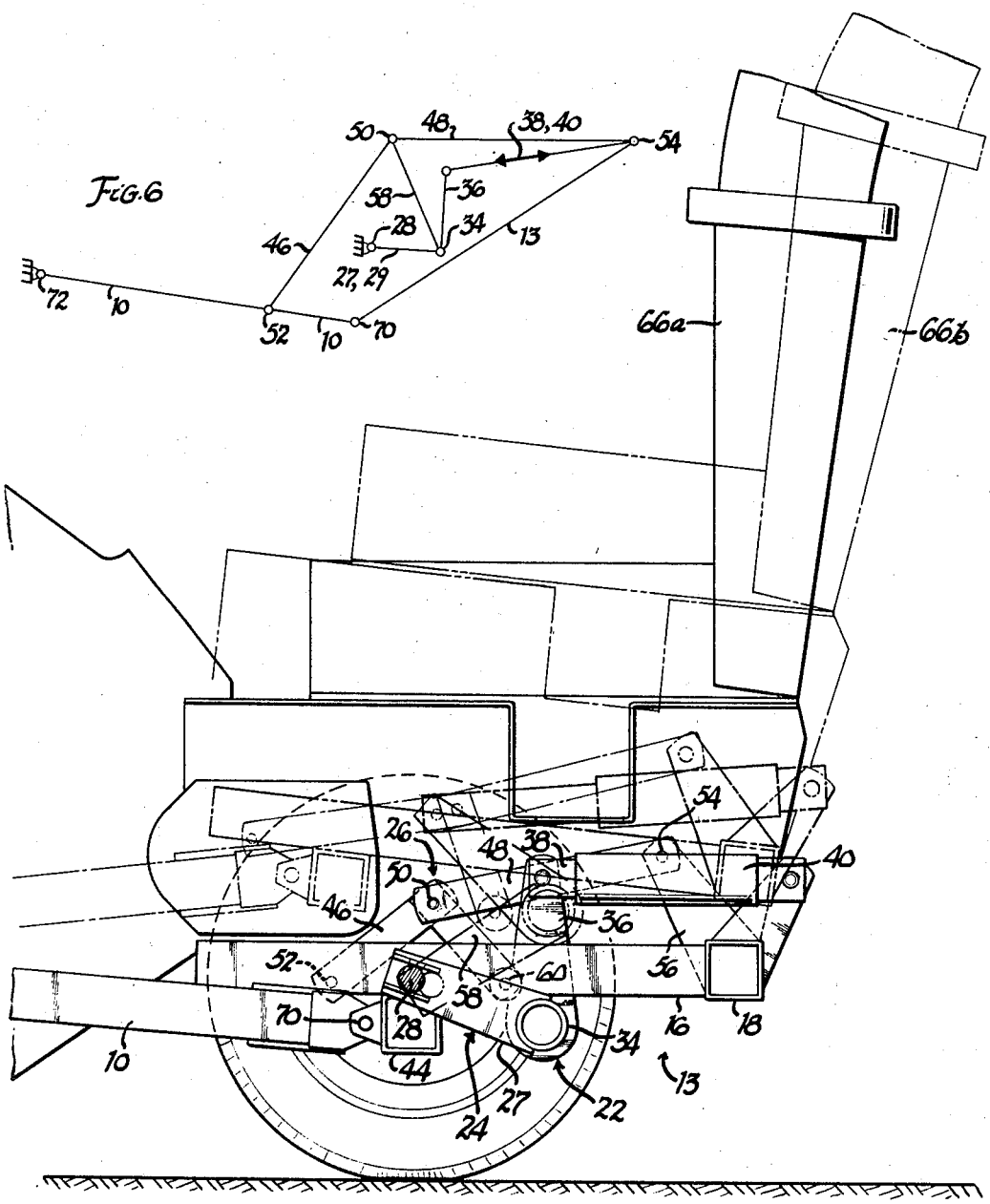

United States Patent Office 3,425,195
Patented Feb. 4, 1969

3,425,195
FORAGE HARVESTER HAVING LIFTING DEVICE
Wolfgang R. Potzsch, Wolfenbuttel, Germany, assignor to J. I. Case Company, Racine, Wis., a corporation of Wisconsin
Filed Feb. 23, 1966, Ser. No. 529,339
U.S. Cl. 56—23     9 Claims
Int. Cl. A01d 75/14; B60g 19/10

ABSTRACT OF THE DISCLOSURE

A lifting device for a crop harvester for maintaining the harvesting unit substantially horizontal at any adjusted position. The lifting device includes toggle links having opposite free ends respectively connected to the relatively movable frame elements of the harvester with a separate link connecting the joint of the toggle to the raising and lowering element of the harvester.

---

This invention relates generally to farm machinery, and in particular to a crop harvester having a lifting device which keeps the harvester's frame and the crop treating units carried thereby substantially parallel to ground level as the frame and treating units are raised and lowered for adjustment purposes.

Known devices for changing the mowing or pickup height of harvesters, typically a forage harvester, operate generally in either of two ways, e.g. (1) the whole machine pivots around its axle or (2) the attachment units pivot around an attachment point which is fixed relative to the remainder of the machine. Problems have been encountered with either type of adjustment. For example, while changing the mowing height of the machine the divider points may be raised or lowered unduly by the pivotal movement, since the divider points or pickup are located far ahead of the pivot point. Also, the pivoting movement of the frame may cause the delivery spout of the harvester to change its position excessively such that it does not throw or distribute the chopped forage material correctly. In some cases, the delivery spout is shifted so much that it hits a trailing wagon or truck.

Briefly, the forage harvester of the invention has a lifting device which can be operated to raise or lower the frame of the harvester, and which keeps the harvester's frame substantially horizontal and parallel to ground level while it is raised or lowered. In a preferred embodiment, a lever is connected to stub axles of the harvester for pivotal movement about the axles, and the lever is connected to the frame of the harvester by a toggle joint. The toggle joint is straightened upon actuation of the lever by a power source such as a hydraulic ram, and the connection of the toggle joint to the frame is such as to raise or lower the frame while keeping it substantially parallel to ground level. Two sections of the frame are also jointed end-to-end like a toggle joint, and these sections also tend to straighten. This avoids excessive pivotal movements which can misposition the crop treating units and delivery spout of the harvester.

It is, therefore, an object of this invention to reduce undesired pivotal movement of the crop treating units and delivery spout of a harvester while the frame of the harvester is adjusted bodily to change the mowing or pickup height.

Another object of the invention is to accomplish adjustment of mowing or pickup heights of a harvester by raising its whole frame (or lowering it) while maintaining the frame substantially parallel to ground level.

Another obect of the invention is to provide a lifting device for adjustably positioning the crop-engaging elements of a harvester by adjusting the frame of the harvester relative to the running undercarriage of the machine.

Other objects of this invention will appear in the following description and appended claims, reference being had to the accompanying drawings forming a part of this specification wherein like reference characters designate corresponding parts in the several views.

On the drawings:

FIGURE 2 is an elevational view, partly structural and partly in outline form, of the harvester of the present invention;

FIGURE 3 shows the various parts of the machine of FIGURE 1 in a raised position and a lowered position such as might be obtained when adjusting the mowing height of the machine;

FIGURE 5 is a somewhat schematic perspective view showing the main parts of the lifting device for a forage harvester in accordance with the invention; and FIGURE 6 is a simplified line diagram of the linkage system of the harvester.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
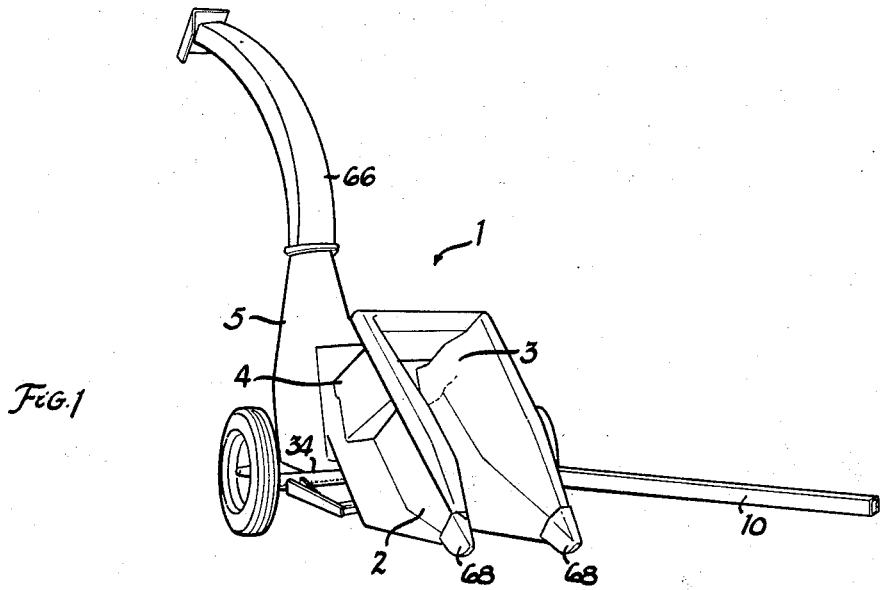
FIGURE 1 is a perspective view of a forage harvester.

As shown on the drawings:

In FIGURE 1, reference numeral 1 refers generally to a harvester or other agricultural machine adapted to traverse a field and having, as functional components:

(1) A crop-engaging and ground following header 2 (illustrated as a corn stalk engaging and severing unit, although the invention is equally applicable to a windrow pickup unit, a cutter bar and draper assembly or the like);

(2) A crop feeding assembly 3 receiving the crop from the header;

(3) A crop treating assembly 4 (a forage harvester cutter and blower assembly, but capable of variation to fit the crop being harvested); and (4) A delivery device 5 for placing the crop in a trailing wagon or other receptacle (illustrated as a blower spout).

Obviously, the present invention may be applied to various types of machines such as corn pickers, balers, combines and the like.

The forage harvester has a drawbar or tongue 10 shown in FIGURE 3 in two positions, the lower of which is shown there in solid lines and the upper being shown in dashed lines. This system of solid and dashed lines for lower and upper positions of parts is utilized only in FIGURE 3. The drawbar 10 is part of the overall frame of the machine. The frame also includes a horizontal subframe 13 (FIGURE 4) comprised of longitudinal structural members 14 and 16 and transverse structural members 18 and 20, all joined together as by welding. Drawbar 10 and subframe 13 are lifted and lowered while remaining essentially horizontal by means of a device generally denoted 22 (FIGURE 3) which includes a toggle joint 26 and a lever system 24 which is generally constructed like a bell crank, particularly when viewed from the side as in FIGURE 3.

The left-hand end of lever arm 27 (as viewed in FIGURE 3) is secured to a stub axle 28 of the machine. There is another lever arm 29 and stub axle 32 at the other side of the harvester, and they are visible in FIGURE 4. Both axles remain substantially stationary while raising or lowering the frame of the machine. Thus, the lever system 24, toggle joint 26 and the frame move relative to the stub axles 28 and 32 during lifting or lowering adjustment. It can be seen from the changed positions of the frame as shown in FIGURE 3 that the frame, and particularly the subframe 13, remain substantially parallel to the ground during adjustment, and this is made possible by lifting the whole frame and linkage system pivotally about the fixed end of the drawbar and by pivoting the frame at point 70.

Figure 4:
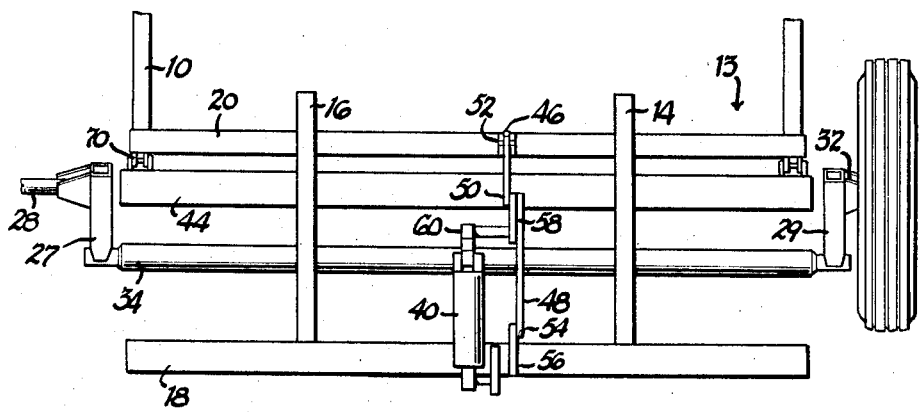
FIGURE 4 is a plan view of the frame and some working parts of the machine of FIGURE 1.

The various parts of the lifting device 22 will be described referring particularly to FIGURES 3, 4 and 5. The axles 28 are fixed points of pivotal reference. The two lever arms 27 and 29 are connected to each other by a cross rod 34. Centrally of cross rod 34 there is a third lever arm 36 which is pivoted at its upper end to a piston 38 of a hydraulic ram having a cylinder 40. Lever arms 27 and 29 together with arm 36 act like a bell crank whose knee is at cross rod 34. When the piston 38 is fully extended lever arms 27 and 29 are in a raised position (as shown in dotted outline in FIGURE 3), and when piston 38 is withdrawn into cylinder 40, lever arms 27 and 29 pivot clockwise to a lowered position (as shown in solid outline in FIGURE 3).

Lever system 24 is connected by the toggle joint 26 to the subframe 13 and also to the drawbar 10. Toggle joint 26 includes two bars 46 and 48 jointed together end-to-end by a pivot connection 50. The other end of bar 46 is pivoted at 52 to transverse frame member 20 which is connected to drawbar 10, and the other end of toggle bar 48 is pivoted at 54 to an upstanding arm 56 which is rigidly connected at its base to the transverse frame member 18. The knee 50 of toggle joint 26 is connected by a third bar member 58 to lever arm 36 at a pivot pin 60 such that the knee of the lever system 24 is connected by bar 58 to the knee of toggle joint 26.

In the operation of the lifting device, when piston 38 moves from a withdrawn position within cylinder 40 to an extended position, cross rod 34 swings in a counterclockwise direction such that toggle arm 58 is put in tension by a force directed generally downwardly. Referring to the line diagram of FIGURE 6, it may be seen that in reaction to the force exerted by the piston 38, a reaction force acting to the right as viewed here is exerted on the joint 54 where toggle bar 48 is jointed to subframe 13. The lines and joints in FIGURE 5 have been given the numbers of the structural parts to which they correspond. Point 72 at the left end of drawbar 10 and point 28 corresponding to one of the stub axles are fixed, and all other points and lines in the diagram are movable. The toggle arms 46 and 48 and the frame arms 10 and 13 have a four-sided or diamond configuration as shown in FIGURE 6. The reaction force on joint 54 tends to straighten the toggle arms 46 and 48 and also tends to straighten arms 10 and 13. Joint 50 moves downwardly relative to the frame, but the whole system is lifted upward about the fixed end of the drawbar. In order for link members 46 and 48 to straighten, the whole system must pivot upward about point 72 at the end of drawbar 10, and the force acting through bar 58 causes frame 13 to pivot clockwise about point 70, the links simultaneously being straightened by the reaction force acting on joint 54. It may be seen that axle 28 will move very slightly to the right during upward adjustment due to the straightening of arms 46, 48 and also arms 10, 13. The subframe 13 rises to the upper position shown in FIGURE 3, but remains substantially parallel to ground level as shown there.

Actually, the subframe is tilted forward slightly in its lowered position and is tilted backward slightly in its upper position, but the overall effect is to maintain the subframe substantially parallel to ground level. It may be noted in FIGURE 3 that the delivery spout starts in position 66a and moves slightly to a new position 66b when the frame is raised. However, there is only a slight movement of the delivery spout and the spout moves upward as well as rearward so that the spout essentially maintains its proper relationship to the trailing wagon. The divider points 68 (FIGURE 2) move from their lower position to a raised position when the frame is raised, and may assume any intermediate position between the upper and lower positions, thereby allowing a continuous adjustment of the position of the cutter bar assembly 76.

The invention provides a simple, rugged lifting device which minimizes undesired pivotal movements of major sections of a harvester, such as its frame, divider points and delivery spout. The lifting device does not require many parts and it can be constructed economically.

I claim:

1. A harvester including, in combination, horizontally extending frame means comprising a drawbar and a subframe jointed to each other in end-to-end relation, crop treating units carried by said frame means, toggle means including toggle members jointed to each other end-to-end and jointed, respectively, to said drawbar adjacent said first mentioned end-to-joint and directly to said subframe rearwardly of said joint to form a four-sided linkage system, axle means supporting said frame means and said toggle means and having ground engaging wheels thereon, lever means connected to one corner of said four-sided linkage system at the joint between said toggle members, and hydraulic power means connected to another corner of said linkage system at a point adjacent a joint between one of said toggle members and said subframe, said power means including a movable member connected to said lever means for moving said lever means to, in turn, raise and lower the entire linkage system while keeping said frame means essentially horizontal.

2. The harvester of claim 1 wherein said toggle means includes a third member connecting the joint between said toggle members to said lever system and wherein said lever system is a type of bell crank having said third member connected to the knee of said crank.

3. The forage harvester machine of claim 1 wherein said toggle means includes first and second bars jointed end-to-end, one of said bars having an end connected to said subframe and the other of said bars having an end connected to said drawbar, said toggle joint further including a member for applying force to the knee of said toggle joint in response to actuation of said lever to raise or lower said frame.

4. The forage harvester of claim 3 wherein said member comprises a third bar jointed to the knee formed by said first and second bars and further connected to said lever.

5. The forage harvester of claim 4 wherein said lever comprises a bell crank having a knee and opposite ends.

6. The forage harvester of claim 5 wherein said knee of said bell crank is jointed to said third bar.

7. The forage harvester of claim 6 wherein one end of said bell crank is connected to said axle and the other end thereof is connected to said power means for actuation thereby.

8. The forage harvester of claim 7 wherein said power means comprises a hydraulic ram having a piston connected to said other end of said bell crank.

9. The forage harvester of claim 8 wherein said knee of said toggle joint is located generally above said knee of said bell crank and said third bar extends between said knees and may be moved by pivotal movement of said bell crank lever about said axle to operate said toggle joint to raise or lower said frame.

References Cited

UNITED STATES PATENTS

| | | | |
|---|---|---|---|
| 2,684,021 | 7/1954 | Ratzlaff | 172—328 |
| 2,701,942 | 2/1955 | Caldwell et al. | 56—23 |
| 2,767,538 | 10/1956 | Scheidenhelm | 172—328 |
| 2,817,942 | 12/1957 | Collins et al. | 56—23 |
| 2,843,991 | 7/1958 | Poehls | 56—23 |
| 2,865,461 | 12/1958 | Heth et al. | 172—328 |
| 2,869,305 | 1/1959 | Murray | 172—328 |
| 2,967,574 | 1/1961 | Morkoski | 172—328 |

ABRAHAM G. STONE, *Primary Examiner.*

PASQUALE A. RAZZANO, *Assistant Examiner.*

U.S. Cl. X.R.

172—328; 280—414.5